(12) United States Patent  
Goldwerger et al.

(10) Patent No.: US 12,210,601 B2  
(45) Date of Patent: Jan. 28, 2025

(54) DECENTRALIZED BIOMETRIC IDENTIFICATION AND AUTHENTICATION NETWORK

(71) Applicant: ANONYBIT, INC., New York, NY (US)

(72) Inventors: Eyal S. Goldwerger, New York, NY (US); Elad Bullkich, New York, NY (US); Eran Mitrani, New York, NY (US)

(73) Assignee: Anonybit, Inc., New York, NY (US)

( * ) Notice: Subject to any disclaimer, the term of this patent is extended or adjusted under 35 U.S.C. 154(b) by 818 days.

(21) Appl. No.: 17/272,258

(22) PCT Filed: Sep. 4, 2019

(86) PCT No.: PCT/US2019/049578  
§ 371 (c)(1),  
(2) Date: Feb. 26, 2021

(87) PCT Pub. No.: WO2020/051232  
PCT Pub. Date: Mar. 12, 2020

(65) Prior Publication Data  
US 2021/0342432 A1 Nov. 4, 2021

Related U.S. Application Data

(60) Provisional application No. 62/726,626, filed on Sep. 4, 2018.

(51) Int. Cl.  
*G06F 21/32* (2013.01)  
*G06N 20/00* (2019.01)  
*H04L 9/32* (2006.01)

(52) U.S. Cl.  
CPC ............ *G06F 21/32* (2013.01); *G06N 20/00* (2019.01); *H04L 9/3218* (2013.01)

(58) Field of Classification Search  
CPC ......... G06F 21/32; G06F 21/45; G06N 20/00; H04L 9/3218  
See application file for complete search history.

(56) References Cited

U.S. PATENT DOCUMENTS 6,735,695 B1 5/2004 Gopalakrishnan et al.  
8,239,685 B2 8/2012 Lee et al.  
(Continued)

OTHER PUBLICATIONS

Dasong Li, Image Semantic Transformation: Faster, Lighter, and Stronger, Mar. 27, 2018, Shanghai JiaoTong University, ZheJiang University (Year: 2018).*

(Continued)

*Primary Examiner* — Brian F Shaw  
(74) *Attorney, Agent, or Firm* — PEARL COHEN ZEDEK LATZER BARATZ LLP

(57) ABSTRACT

A measurement unit of multiple measurement units is received. The measurement unit represents a portion of a biometric measurement of a user in response to a request to authenticate the user. Whether the measurement unit corresponds to a template unit of multiple template units is determined. The template unit represents a portion of a biometric template that represents a characteristic of the user that distinguishes the user from other users. Responsive to determining that the measurement unit corresponds to the template unit, a sub-result of multiple sub-results is determined based on a comparison between the measurement unit and the template unit. The sub-result indicates a similarity between the measurement unit and the template unit. The sub-result is sent to a node of the multiple nodes. The authentication of the user is based at least in part on the sub-result.

25 Claims, 8 Drawing Sheets

(56) References Cited

U.S. PATENT DOCUMENTS

| | | |
|---|---|---|
| 8,942,429 B2 | 1/2015 | Le Saint |
| 2009/0113209 A1* | 4/2009 | Lee .................. G06F 21/32 |
| | | 713/186 |
| 2011/0205020 A1* | 8/2011 | Le Saint ............ G06F 18/256 |
| | | 340/5.82 |
| 2013/0339749 A1* | 12/2013 | Spuehier ............ H04L 9/3231 |
| | | 713/186 |
| 2014/0270408 A1* | 9/2014 | Hutchison, IV .... G06F 16/5838 |
| | | 382/118 |
| 2016/0171280 A1 | 6/2016 | Han et al. |

OTHER PUBLICATIONS

Li, D. and Wang, J., 2018. Image Semantic Transformation: Faster, Lighter and Stronger. arXiv preprint arXiv:1803.09932.
International Search Report and Written Opinion on Application No. PCT/US2019/049578, mailed on Nov. 12, 2019.

\* cited by examiner

DECENTRALIZED BIOMETRIC IDENTIFICATION AND AUTHENTICATION NETWORK

TECHNICAL FIELD

Embodiments of the present disclosure relate to the field biometric identification and authentication and, in particular a decentralized biometric identification and authentication network.

BACKGROUND

Biometric identification may include the identification of a person by the evaluation of one or more distinguishing biological features or characteristics. Unique biological identifiers include, but are not limited to, facial features, fingerprints, hand geometry, earlobe geometry, retina patterns, iris pattern, and voice frequencies, among others.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method comprising: receiving a measurement unit of a plurality of measurement units, wherein the measurement unit represents a portion of a biometric measurement of a user in response to a request to authenticate the user; determining whether the measurement unit corresponds to a template unit of a plurality of template units, wherein the template unit represents a portion of a biometric template that represents a characteristic of the user that distinguishes the user from other users; responsive to determining that the measurement unit corresponds to the template unit, determining a sub-result of a plurality of sub-results based on a comparison between the measurement unit and the template unit, wherein the sub-result indicates a similarity between the measurement unit and the template unit; and sending the sub-result to a second node of the plurality of nodes, wherein the authentication of the user is based at least in part on the sub-result.

A further aspect of the disclosure provides a system comprising: a memory; and a processing device, coupled to the memory, the processing device to perform a method according to any aspect or embodiment described herein. A further aspect of the disclosure provides a computer program product (such as a tangible computer-readable medium or a software product which can be downloaded without necessarily being stored for a non-transitory way) comprising instructions that, responsive to execution by a processing device, cause the processing device to perform operations comprising a method according to any aspect or embodiment described herein. A further aspect of the disclosure provides a computer program comprising instructions that, when executed by a processing device, cause the processing device to perform operations according to any aspect or embodiment described herein.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Figure 1:
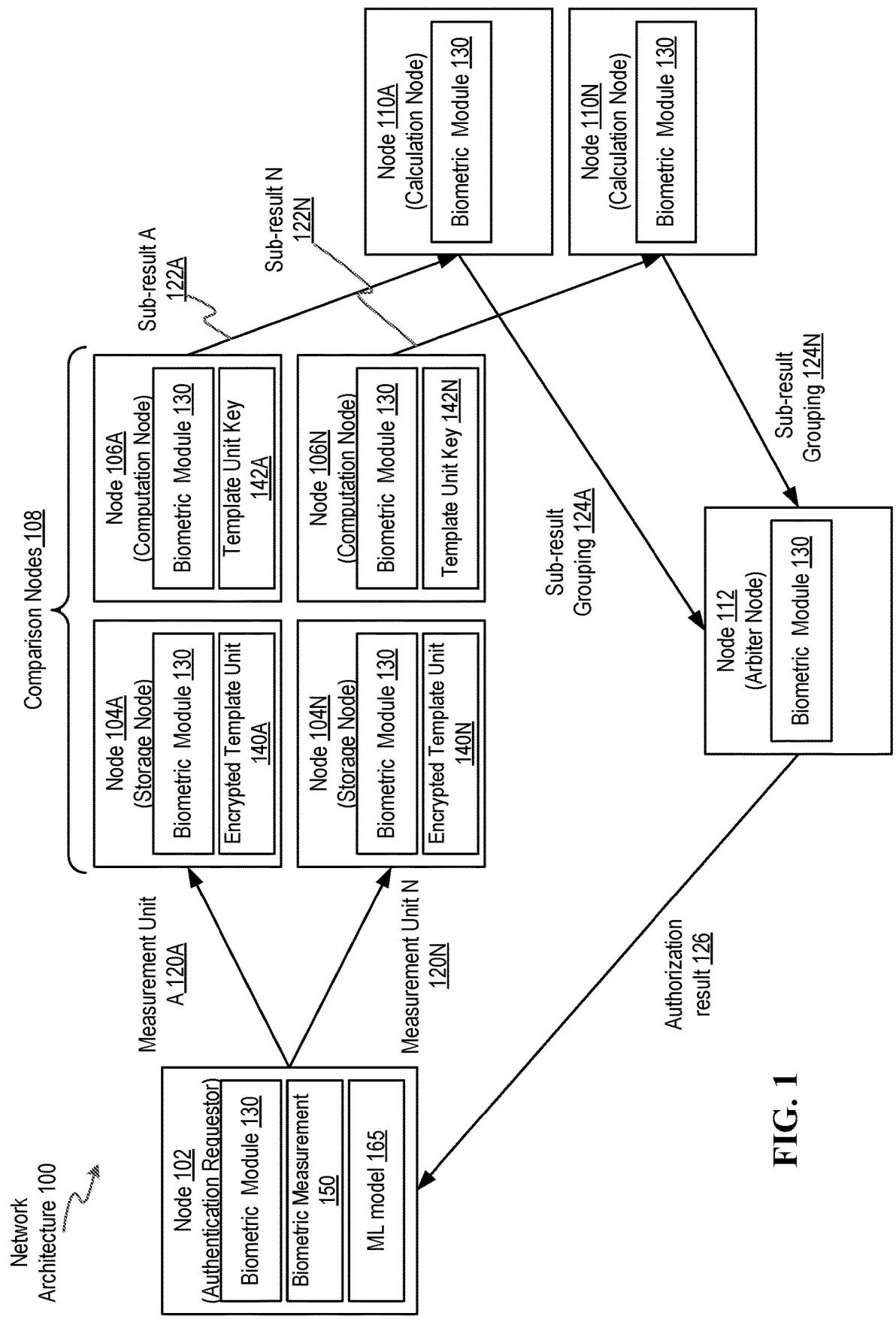
FIG. 1 illustrates an example network architecture, in accordance with some embodiments of the disclosure.

Authentication can refer to a process of proving or verifying an assertion, such as the identity of a user. For example, user X can be authenticated to verify that user X is actually user X. Identification can refer to the process of indicating a person or thing's identity. For example, a person's fingerprint can be searched against a database of fingerprints to determine the person's identity.

Biometric authentication or biometric identification can be a type of authentication or identification, respectively that uses a biometric measurement of a person to perform the authentication operation or identification operation. A biometric measurement can refer to a measurement of a characteristic or feature of a person. The characteristic or feature of the person measured using a biometric measurement can be distinctive and measurable and be used to distinguish a person from other people. Examples of biometric measurements include, but are not limited to, fingerprints, hand geometry, images of the face and eyes, among others.

To perform biometric authentication, a biometric measurement can be compared to a biometric template. A biometric template may refer to a digital representation of a unique feature or characteristic of a person that has been extracted from one or more biometric samples (e.g., images of a person's face). A biometric measurement can be compared to a biometric template to determine a similarity. If the biometric measurement is determined to be similar to the biometric template, authentication or identification of a person can be confirmed (e.g., the person that supplied the biometric measurement is the same person whose biometric samples created the biometric template).

In some conventional biometric authentication and identification systems, the biometric authentication operation or biometric identification operation is performed at a centralized location, such as a centralized server. Biometric information can be, and is most often, sensitive information. Storing a biometric template at a central location or performing the authentication or identification operation at a central location can compromise the biometric data, which leaves sensitive information vulnerable to malicious attacks. In some conventional biometric authentication and identification systems, parts of a biometric template can be stored at various locations to provide additional security. However, when performing an authentication or identification operation, the parts of the biometric template are brought together at a single location, such as a centralized server, so that the authentication or identification operation can be performed. Having the biometric template at a central location, even for a short period, can compromise the security of the biometric template.

Decentralizing biometric authentication and biometric identification operations have additional challenges. A decentralized network or system can refer to the allocation of resources, such as hardware and software, to individual devices, such as nodes. In a decentralized network or system the workload (e.g., authentication or identification operation) can be distributed among multiple devices or nodes. No single device or node in the decentralized network serves as a central hub. A challenge of implementing a decentralized biometric authentication and identification network is that a biometric template may not be identical to a corresponding biometric measurement, which makes comparing parts of a biometric template with corresponding parts of a biometric measurement challenging.

Aspects of the disclosure address the above challenges, as well as others by providing a decentralized biometric identification and authentication network where the biometric template is transformed into multiple template units that each represent a portion of the biometric template. The template units are distributed among nodes of the network, where no single node stores or has access to all the template units of the biometric template (e.g., zero-knowledge authentication).

In embodiments, to perform a biometric authentication or identification operation, a biometric measurement of a person is obtained, such as an image of a person's face. The biometric measurement can be transformed in a similar manner as the biometric template such that the biometric measurement is transformed into multiple measurement units that each represent a portion of the biometric measurement.

In embodiments, the measurement units of the biometric measurement can be sent to various comparison nodes of the decentralized network. The comparison nodes can have access to one or more template units, but not all the template units of the biometric template. A particular node of the comparison nodes can determine a sub-result that indicates a similarity between the received measurement unit and a corresponding template unit. The sub-results are distributed to multiple calculation nodes that further aggregate multiple sub-results into sub-result groups. The sub-result groups can be sent to an arbiter node that can determine whether the person is authenticated or not based on aggregating the sub-result groups and comparing the result of the aggregated sub-result groups to a threshold. The authentication result can be sent to the entity that requested the authentication of the person.

In some embodiments, a biometric measurement and biometric template can each be translated into a vector in multi-dimensional Euclidian space. The vectors that are produced for the same person are close to each other in the multi-dimensional Euclidian space, while more distant vectors are produced for different people. By comparing a distance of a vector (e.g., L2-norm distance) that represents a biometric measurement of a person, and a vector that represents a biometric template of a person, it can be determined whether the biometric measurement and biometric template are of the same person or different people—which can be used to authenticate or identify a person. Because of the commutative property of determining distance between vectors in multi-dimensional Euclidian space, the distance between corresponding vector coordinates of two vectors can be calculated independently, and later summed in any order to determine the distance between the two vectors.

In view of the above, in some embodiments a trained machine learning model can transform a biometric template of a person into template units that represent vector coordinates of a template vector in multi-dimensional Euclidian space. The vector coordinates of the template vector can be distributed among comparison nodes of the decentralized network. Similarly, the trained machine learning model can transform a biometric measurement of a person into measurement units that represent vector coordinates of a measurement vector in multi-dimensional Euclidian space. The measurement units can be sent to corresponding nodes of the comparison nodes. The sub-distance (e.g., sub-result) between a vector coordinate of measurement vector and a vector coordinate of a template vector can be calculated at each of the comparison nodes. The sub-distances can be send to calculation nodes where they are aggregated into groups of sub-results. The groups of sub-results can be sent to an arbiter node that determines the distance between the measurement vector and the template vector. The distance is compared to a threshold to determine whether the person is authenticated (or identified) or not. In performing the above mentioned, machine learning classification can be effectively distributed among nodes of the decentralized network, where the nodes perform part of the classification operation.

As noted, a technical problem addressed by the embodiments of the disclosure is data security in performing operations such as biometric authentication or biometric identification. For example, in performing biometric authentication convention systems have a biometric template that is stored at or used by central device, which makes the biometric template vulnerable to cyber theft. Additionally, performing biometric authentication or identification using a decentralized system where the nodes of the system perform parts of the authentication or identification operation is a technical problem at least in part because a biometric measurement and a biometric template are not identical. Further, performing biometric authentication or identification at a centralized system can use a large amount of computational resources.

At technical solution to the above technical problem may include: receiving a measurement unit of a plurality of measurement units, wherein the measurement unit represents a portion of a biometric measurement of a user in response to a request to authenticate the user; determining whether the measurement unit corresponds to a template unit of a plurality of template units, wherein the template unit represents a portion of a biometric template that represents a characteristic of the user that distinguishes the user from other users; responsive to determining that the measurement unit corresponds to the template unit, determining a sub-result of a plurality of sub-results based on a comparison between the measurement unit and the template unit, wherein the sub-result indicates a similarity between the measurement unit and the template unit; and sending the sub-result to a second node of the plurality of nodes, wherein the authentication of the user is based at least in part on the sub-result.

Thus, a technical effect of the disclosure can include increasing security of a biometric template used in biometric authentication and identification, performing parts of authentication and identification operation at various nodes in a decentralized network, and reducing the computational resources used by a central device or system performing authentication or identification by distributing the workload of authentication and identification among nodes in a decentralized network.

FIG. 1 illustrates an example network architecture, in accordance with some embodiments of the disclosure. The network architecture 100 (also referred to as "system" or "network" herein) includes computer node 102 (also referred to as "authentication requestor" herein), comparison computer nodes 108, computer nodes 110A-110N (also referred to as "calculation nodes(s)" herein, and generally referred to as "node(s) 110" herein), and computer node 112 (also referred to as "arbiter node" herein). In some embodiments, comparison nodes 108 can include computer nodes 104A-104N (generally referred to as "node(s) 104" herein) and computer nodes 106A-106N (generally referred to as "node(s) 106" herein). It can be noted that "computer node" can also be referred to as "node" herein. It may also be noted that network architecture 100 is provided for illustration, rather than limitation. In implementations, the network architecture 100 may include the same, fewer, more, or different elements configured in the same or different manner. Each of node 102, nodes 104, nodes 106, nodes 110, and node 112 can include one or more nodes. In embodiments, there is not a limitation on the number of nodes that can be implemented at network 100. In embodiments, biometric module 130 operating at various nodes of network 100 can perform the operations described herein.

In some embodiments, the nodes of network 100 are interconnected and used to perform a common task, such as biometric authentication (also referred to as "authentication" herein) or biometric identification (also referred to as "identification" herein), so that the nodes of network 100 can be viewed as a single computer system or network. Each of nodes of network 100 can include, but is not limited to, any processor-based device such as a desktop computer, a laptop computer, a cellular telephone, a smart phone, a table computer, a mainframe computer, a personal digital assistant, a server computer, a microprocessor, system-on-chip processor, or any other device with similar capability. In some embodiments, one or more nodes of network 100 may be running its own instance of an operating system (OS).

In some embodiments, one or more nodes of network 100 can have its own physical or virtual memory. Memory may include, but is not limited to, main memory such as, read-only memory (ROM), flash memory, dynamic random access memory (DRAM) (e.g., synchronous DRAM (SDRAM) or DRAM (RDRAM), etc.), and static memory (e.g., flash memory, static random access memory (SRAM), etc.).

In some embodiments, one or more nodes of network 100 can be coupled to one or more mass storage devices, which can include, for example, flash memory, magnetic or optical disks, or tape drives; read-only memory (ROM); random-access memory (RAM); erasable programmable memory (e.g., EPROM and EEPROM); flash memory; or any other type of storage medium.

In some embodiments, one or more of the nodes of the network 100 may be connected to each other through a network. In some embodiments, the network may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In some embodiments, one or more nodes of network 100 can communicate using an application programming interface (API). An API can include a set of functions or procedures that allow a device (e.g., such as third-party node) to access features or data of an operating system (OS), application, or service.

In some embodiments, network 100 can be a decentralized network or system. As noted above, in a decentralized network or system the workload is distributed among multiple devices or nodes, where there is no single device or node that serves as a central hub (e.g., information does not need to pass through a central hardware device). An example of a decentralized network is a peer-to-peer (p2p) network. In some embodiments, in a decentralized network or system the operation or ownership of the nodes of network 100 is split between multiple entities. For example, one or more of nodes 102, 108, 110, and 112 can be operated independently by different entities.

In some embodiments, a machine learning model can be implemented, such as machine learning model 165 at node 102. In implementations, the machine learning model 165 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a back-propagation learning algorithm or the like. For convenience, the remainder of this disclosure will refer to the implementation as a neural network, even though some implementations might employ an SVM or other type of learning machine instead of, or in addition to, a neural network. The machine learning model 165 refers to a trained machine learning model, unless otherwise described.

In some implementations, a training engine is used to train the machine learning model 165 using a training dataset. Once trained, the trained machine learning model 165 can receive new input to produce one or more output values. For example, inputs to the trained machine learning model 165 can include an input data received from a client device (e.g., the input data can include one or more biometric samples or biometric measurements of one or more people). In some embodiments, the output of the trained machine learning model can include vector coordinates of a vector that represents the input data in multi-dimensional space, such as Euclidian space. Euclidian space can include a two-dimensional Euclidian plane, the three-dimensional space of Euclidian geometry, and similar space of higher dimension.

Training the machine learning model, such as a neural network, when there is not a centralized network or database can present additional challenges. In some embodiments, a machine learning model training system can be based on data parallelism (i.e., replicas of a machine learning model can be distributed in the network 100). Each model can be trained on a small batch and possibly different group of collected templates. In another embodiment, a user may be encouraged (e.g., compensated) to share their biometric measurements anonymously with the p2p network to train (e.g., centralized training) the neural network offline.

In some embodiments, the output of the trained machine learning model 165 may include confidence data that indicates a level of confidence that the output (e.g., prediction) is appropriate or true, for instance. In one example, the level of confidence is a real number between 0 and 1 inclusive, where 0 indicates no confidence and 1 indicates absolute confidence that the output is appropriate or true.

In some embodiments, authentication of a person using network 100 can be based on a zero-knowledge authentication technique wherein no individual node of network 100 has a complete knowledge of a biometric template. For example, zero-knowledge authentication can implement multiple nodes operated by multiple independent entities. The multiple nodes can perform computational operations involved in authentication wherein no single node has complete knowledge of the biometric template and cannot extrapolate the biometric template from information available to the node. A characteristic of zero-knowledge authentication can include nodes of a decentralized network performing some of the computational operations that are used in the aggregate to make a determination regarding authentication. In some embodiments, a zero-knowledge identification can be implemented in a similar manner.

A biometric measurement can refer to a measurement of a characteristic or feature of a person. The characteristic or feature of biometric measurements can be distinctive and measurable and used to describe an individual. In some embodiments, the characteristic of the biometric measurement can be used to distinguish the person from other people. Examples of a biometric measurement can include, but are not limited to, measurements of a fingerprint, face, DNA, palm, hand geometry, iris, retina, ear, voice, among others. One or more modalities can be used to capture a biometric measurement. The one or more modalities include, but are not limited to, images, audio, biomaterial samples (e.g., blood, saliva, etc.), among others.

A biometric template may refer to a digital representation of unique features or characteristics of a person (e.g., user) that have been extracted from one or more biometric samples. The characteristic of the biometric template can be used to distinguish the person from other people. For example, one or more biometric samples of a user may be collected. The biometric sample may include one or more of an image of the user's face, finger, iris or retina, or a sample of the user's voice. The sample may be analyzed and converted into a biometric template using one or more template generators (e.g., machine learning model) that transform the biometric samples into a biometric template.

In some embodiments, the network 100 can split a biometric template into multiple template units (also referred to as "biometric template units" herein). In some embodiments, the template units can be distributed among multiple nodes of the network 100. For example, the template units can be distributed among comparison nodes 108. In some embodiments, no single node stores all the template units pursuant to zero-knowledge authentication. For example, different nodes of network 100 can store one or more different template units, but no single node stores all the template units (for a person or system) and no single node knows where all the template units are stored. In some embodiments, the template units stored at the different nodes do not leave the nodes at which they are stored. For example, the template unit stored at node 104A is not sent to any other node in network 100 to perform any part of an authentication operation. In some embodiments, one or more of the template units can be redundantly stored at multiple nodes of the network 100. For example, template unit 1 of biometric template A can be stored at 10 different nodes of network 100.

In some embodiments, to perform an authentication or identification operation, a biometric measurement can be submitted for purposes of authenticating a user. The biometric measurement can be split into multiple measurement units. Each of the measurement units can represent a portion of the biometric measurement of the user. For example, node 102 can be a third-party entity that requests an authentication of a user (e.g., user of the third-party entity). The biometric measurement can be an image of the user's face, for example. Node 102 can transform the biometric measurement into multiple measurement units.

In some embodiments, the measurement units can be sent to a subset of nodes that store corresponding template units. A subset can refer to one or more of something. For example, node 102 can distribute the measurement units among different nodes of comparison nodes 108. Comparison nodes 108 can store one or more template units, but not all the template units of the biometric template. In an illustrative example, a node of comparison nodes 108 stores a single template unit.

In some embodiments, the received measurement units can be compared to corresponding template units to determine a sub-result. The sub-result can indicate a similarity between a particular measurement unit and a corresponding template unit. For example, a node of comparison nodes 108 that receives a measurement unit can compare the measurement unit with a corresponding template unit stored at the particular node. The node of comparison nodes 108 can generate a sub-result based on the comparison. The sub-result indicates a similarity between the measurement unit and template unit.

In some embodiments, the sub-results generated by the nodes, such as the comparison nodes 108, can be distributed to other nodes to calculate sub-result grouping. A sub-result grouping can be an aggregate or combination of one or more sub-results. A sub-result grouping combines some but not all the sub-results of the authentication operation. For example, multiple sub-results from comparison nodes 108 can be sent to node 110A and multiple different sub-results can be sent to node 110N. Node 110A can calculate a sub-result grouping 124A for the first multiple sub-results and node 110N can calculate a sub-result grouping 124N for the second multiple of sub-results.

In some embodiments, the sub-result groupings can be sent to an arbiter node that can make a final determination as to whether to authenticate the user. For example, node 110A can send the sub-result grouping 124A to node 112 and node 110A can send the sub-result grouping 124N to node 112. Node 112 can determine a final result based on the multiple sub-result groupings. For instance, node 112 can combine the multiple sub-result groupings into the final result. The final result can be compared to a threshold. If the final result satisfies the threshold, the user is authenticated. If the final result does not satisfy the threshold, the user in not authenticated. In some embodiments, an authentication result (which can be different than the final result) that indicates whether the user is authenticated or not can be send to node 102. Node 102 can authenticate the user (or not) based on the authentication result.

In some embodiments and as noted above, a particular measurement unit corresponds to a particular template unit. Each measurement units of a biometric measurement can be associated with an identifier (also referred to as an "encoding" herein) that identifies a particular measurement unit. Similarly, each of the template units of a biometric template can be associated with an identifier that identifies a particular template unit. For instance, a biometric measurement can be transformed into 3 measurement units that are identified as A, B and C, and a biometric template can be transformed into 3 template units that are also identified as A, B, and C. Measurement unit A corresponds to template unit A, measurement unit B corresponds to template unit B, and measurement unit C corresponds to template unit C. In embodiments, measurement units are compared to corresponding template units to determine sub-results. In embodiments, measurement units are not compared to non-corresponding measurement units. In some embodiments, the identifier that identifies a measurement unit or template unit can follow the respective measurement unit or template unit or the corresponding results (e.g. sub-result or sub-result grouping) throughout the operations described herein. For example, sub-result A 122A can be associated with the identifier of the measurement unit A 120A and the identifier of the corresponding template unit (e.g., encrypted template unit 140A).

In some embodiments, one or more of the nodes of network 100 can be associated with a partial map that can be used to determine to which nodes of network 100 a particular node is to send respective data. A partial map can indicate the data that some nodes of network 100 store or indicate the operations that some nodes of network 100 perform. No one node of network 100 has a complete map of network 100. In some embodiments, a partial map associated with particular node (also referred to as "local partial map" herein) may not identify every node to which the particular node is to send its data.

In an example, node 102 sends measurement units of a biometric measurement to comparison nodes 108. Node 102 can have a partial map that indicates that measurement unit A is to be sent to node 104A, measurement unit B is to be sent to node 104B (not illustrated), and measurement unit C is to be sent to node 104C (not illustrated). Node 104A-C may or may not have the corresponding template units A, B, and C, respectively. In embodiments, if any of the nodes receive data (e.g., measurement unit) for which they do not have corresponding data (e.g., template unit), the particular node can forward the data using a partial map associated with the particular node. For example, if node 104A receives measurement unit A but does not have corresponding template unit A, node 104A can use a partial map associated with node 104A to identify another node, such as node 104D, that may store template unit A. Node 104A can forward to measurement unit A to node 104D. If node 104D does not have the corresponding template unit A, node 104D can also forward measurement unit A using a partial map associated with node 104D. The measurement unit A can be forwarded until it is received by a node that is associated with a corresponding template unit A. In embodiments, the aforementioned partial map can be used by one or more nodes of network 100.

In some embodiments, a partial map at a particular node can be dynamically updated during operation of the network 100. For example, if node 104A forwards measurement unit A to node 104D. Node 104A can send a message to node 102 indicating that measurement unit A has been forwarded to node 104D. Node 102 can dynamically update the local partial map to identify node 104D as storing template unit A, for instance.

Authentication and identification using vectors is further described below.

In some embodiments, node 102 can request an authentication of a user. For example, node 102 can represent a user device. In another example, node 102 can be a third-party device (e.g., a banking institution) that is requesting authentication of a user of the corresponding third-party application or service.

In some embodiments, node 102 receives a biometric measurement 150 of a user that is to be authenticated. For example, node 102 can be a user device and can include a digital camera that captures a digital image of the user's face. In another example, node 102 operating as a third-party device receives an image of a user's face from another device, such as a user device.

In some embodiments, node 102 transforms the biometric measurement 150 into multiple measurement units that each represent a portion of a biometric measurement. As described above, each of the measurement units can be associated with an identifier. In some embodiments, machine learning model 165 is used to transform the biometric measurement from one domain to another domain. For example, the biometric measurement represented as an image of the user's face can be used as input to the machine learning model 165. In some embodiments, the output of the machine learning model 165 can include vector coordinates of a vector (e.g., measurement vector) in Euclidian space. The vector in Euclidian space can represent the biometric measurement. In some embodiments, a measurement unit of the biometric measurement can correspond to a particular vector coordinate of the measurement vector.

In some embodiments, a machine learning model (similar or the same as machine learning model 165) can also be used to transform the biometric template from one domain to another domain. For example, the one or more biometric samples can be used as input to the machine learning model. In some embodiments, the output of the machine learning model can include vector coordinates of vector (e.g., template vector) in Euclidian space. The vector can represent the biometric template. In some embodiments, a template unit can correspond to a particular vector coordinate of the template vector. Transformation of biometric measurements and biometric templates using a machine learning model is further described with respect to FIGS. 3 and 4.

In some embodiments, the measurement units of biometric measurement 150 are distributed among multiple comparison nodes 108. For example, measurement units A-N can be distributed to nodes 104A-104N, respectively. In some embodiments, node 102 can distribute the measurement units of biometric measurement 150 in accordance with a local partial map.

In some embodiments, comparison nodes 108 compare the respective measurement units with a corresponding template unit of a biometric template to generate a sub-result. In some embodiments, to compare a measurement unit to a corresponding template unit, a comparison node 108, can calculate a distance (e.g., L2-norm distance) between a vector coordinate of the measurement vector and the vector coordinate of the template vector in Euclidian space. The sub-result can identify the calculated distance.

In some embodiments, comparison operation performed by comparison nodes 108 can be separated between different node types, such as storage nodes 104 and computation nodes 106. In some embodiments, storage nodes 104 can store template units of a biometric template, where each storage unit 104 stores one or more template units but not all the template units of a biometric template. If a storage node 104 receives a measurement unit that corresponds with a stored template unit, storage node 104 can send the measurement unit and the corresponding template unit to a computation node 106. In some embodiments, computation nodes 106 can compute a sub-result based on a comparison of the measurement unit with the corresponding template unit.

In some embodiments, the template units stored at storage nodes 104 can be encrypted. In some embodiments, each of the template units that are stored at storage nodes 104 can be encrypted with a different key (e.g., encryption key). For example, storage node 104A can store encrypted template unit 140A with a first key. Storage node 104N can store encrypted template unit 140N with a second key. The first key can be different than the second key.

In an example, the storage nodes 104 can receive respective measurement units from node 102. For example, node 104A receives measurement unit A 120A from node 102, and node 104N receives measurement unit N 120N from node 102. Measurement unit A 120A can correspond to encrypted template unit 140A, and measurement unit N 120N can correspond to encrypted template unit 140N.

In some embodiments, storage nodes 104 can determine whether the received measurement unit corresponds to the template unit stored at the particular storage node 104. For example, storage node 104A can compare an identifier of the measurement unit 120A to an identifier of encrypted template unit 140A. If a match is determined (e.g., both are encoded with the same identifier), storage node 104A determines that measurement unit A 120A corresponds to encrypted template unit 140A. If a match is not determined, storage node 104A can forward measurement unit A 120A to another storage node using a local partial map.

In some embodiments, a storage node 104 determines that the received measurement unit corresponds to the template unit stored at the particular storage node 104, the storage node can send both the measurement unit and the corresponding encrypted template unit to a computation node 106 (e.g., using a local partial map). For example, storage node 104A can send measurement unit A 120A and the encrypted template unit 140A to computation node 106A. Storage node 104N can send measurement unit N 120N and encrypted template unit 140N to computation node 106N.

In some embodiments, computation nodes 106 can determine the sub-result based on a comparison of the measurement unit and the corresponding decrypted template unit. In some embodiments, each computation node 106 stores a key that corresponds to a particular encrypted template unit. The computation node can use the key to decrypt the encrypted template unit and use the decrypted template unit for comparison with the corresponding measurement unit. Similarly, in some embodiments one or more of the computation nodes 106 has a different decryption key. For example, computation node 106A receives both measurement unit A 120A and encrypted template unit 140A from node 104. Computation node 106A uses template unit key 142A to decrypted encrypted template unit 140A. Computation node 106A determines the sub-result A 122A based on the comparison between the decrypted template unit and measurement unit A 120A. Computation node 106N uses template unit key 142N to decrypted encrypted template unit 140N. Computation node 106N determines the sub-result N 122N based on the comparison between the decrypted template unit and measurement unit N 120N.

In some embodiments, comparison nodes 108 can send one or more sub-results to one or more calculation nodes, such as nodes 110. In some embodiments, comparison nodes can determine which nodes to send the sub-results based on local partial maps. For example, computation node 106A can send sub-result A 122A to node 110A. Computation node 106N can send sub-result 122N to node 110N.

In some embodiments, each node 110 can receive one or more sub-results from one or more nodes of comparison nodes 108. In some embodiments, no single node of the calculation nodes (e.g., nodes 110) receive all the sub-results associated with an authentication operation.

In some embodiments, nodes 110 can calculate sub-result groupings based on the one or more sub-results received by nodes 110. For example, node 110A can receive sub-result A 122N and sub-result B (not shown). Node 110A can calculate sub-result grouping 124A based on sub-result A 122 and sub-result B. Node 110N can receive sub-result N 122N and sub-result M (not shown). Node 110N can calculate sub-result grouping 124N based on sub-result N 122N and sub-result M.

In some embodiments, sub-result groupings can be an aggregate of one or more sub-results. For example, in embodiments where the sub-result are distances between corresponding vector coordinates. The sub-results can be added together (based on the commutative property) to generate a corresponding sub-result grouping.

In some embodiments, the calculation nodes, such as nodes 110, can send the sub-result groupings to an arbiter node, such as node 112. For example, node 110A can send sub-result grouping 124A to node 112. Node 110N can send sub-result grouping 124N to node 112. In some embodiments, the calculation nodes can determine to which node to send the sub-result groupings based on local partial maps. In some embodiments, the arbiter node to which the calculation nodes send the sub-result grouping can change from time to time.

In some embodiments, the arbiter node, such as node 112, can determine an authorization result 126. An authorization result 126 can indicate whether the user is authorized or not. In some embodiments, node 112 can calculate a result using the one or more sub-result groupings. For example, node 112 can further aggregate the sub-result groupings 124A-124N into a final result. In some embodiments, the final result can be compared against an authorization threshold. If the final result satisfies the authorization threshold, the arbiter node can determine that that user is authorized. If the final result does not satisfy the threshold, the arbiter node can determine that the user is not authorized. In some embodiments, the arbiter final result can indicate a distance between the measurement vector and the template vector. If the distance between the measurement vector and the template vector is less than the authorization threshold, the arbiter node determines that the user is authorized. If the distance between the measurement vector and the template vector is greater than the authorization threshold, the arbiter node determines that the user is not authorized.

In some embodiments, some or all of the sub-results can be used to determine authorization. For example, one or more computation nodes 106 can be off-line and unable to send respective sub-results. The arbiter can receive one or more sub-result groupings that do not reflect all the sub-results (e.g. the comparison of all the measurement units to corresponding template units). Arbiter node can still use the resultant sub-groupings that do not contain all the sub-results to determine whether the user is authorized.

In some embodiments, arbiter node, such as node 112, can send the authorization result 126 to node 102 (e.g., the node that requested the authorization). The authorization result 126 can indicate whether the user is authorized or not. Node 102 can authorize the user (or not) based on the authorization result 126.

In some embodiments, the nodes of network 100 can be redundant so that of one or more nodes is off-line, there are still nodes available to perform the one or more operations or store the respective data. For example, node 106A includes template unit key 142. Network 100 can also include additional nodes that also include template unit key 142 and that can perform the computation operation. In some embodiments, the data exchanged between nodes can also be redundant. For example, node 102 sends measurement unit A 120A to node 104A. Node 102 can also send multiple copies of measurement unit A 120A to one or more other nodes of network 100.

It can be noted that the authentication operation has been described above, for purposes of illustration, rather than limitation. In other embodiments, similar operations can be performed for an identification operation.

In situations in which the networks discussed here collect personal information about users, or may make use of personal information, the users may be provided with an opportunity to control whether the network collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the network 100.

It can be noted that the various nodes of network 100 are described as performing various operations for purposes of illustration, rather than limitation. In some embodiments, one operations performed by a particular node type (e.g., authentication requestor, comparison node, calculation node, or arbiter node) can be performed by another node type. For example, the operations performed by calculation nodes 110 can be performed by comparison nodes 108 or node 112, for example.

The following methods described with respect to FIGS. 2-3 and FIGS. 5-6 can be performed by processing logic that may include hardware (circuitry, dedicated logic, etc.), software (e.g., instructions run on a processing device), or a combination thereof. In some embodiments, some or all the operations of methods may be performed by one or more components of network 100 of FIG. 1. In some embodiments, one or more operations of the methods may be performed by biometric module 130 of network 100 (e.g., biometric module 130 at a comparison node 108) as described with respect to FIG. 1. It may be noted that components described with respect FIG. 1 may be used to illustrate aspects of FIGS. 2-3 and FIGS. 5-6. It can further be noted that the operations of each of the methods can be performed serially, in parallel, or with the same, fewer, greater, or different operations in some embodiments.

Figure 2:
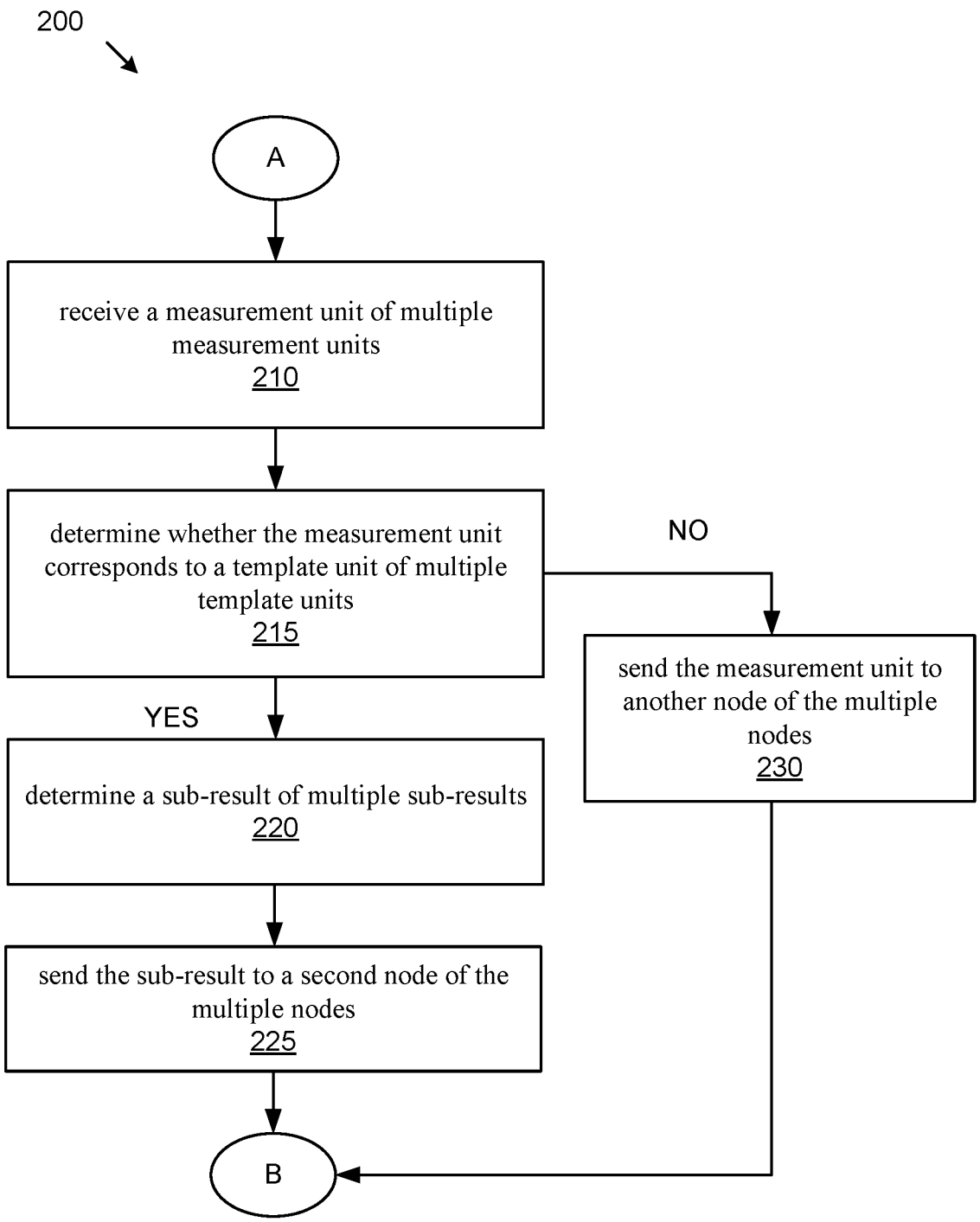
FIG. 2 is a flow diagram that illustrates a method of determining sub-results of an authentication operation, in accordance with embodiments of the disclosure.

FIG. 2 is a flow diagram that illustrates a method of determining sub-results of an authentication operation, in accordance with embodiments of the disclosure.

At block 210, processing logic performing method 200 can receive a measurement unit of multiple measurement units. In some embodiments, the measurement unit represents a portion of a biometric measurement of a user in response to a request to authenticate the user.

In some embodiments, the node performing method 200 is part of a decentralized network including multiple nodes. The multiple nodes are operated by different entities.

In some embodiments, processing logic can receive, from a third node of the multiple nodes, the template unit of the multiple template units. For example, a storage node can send a template unit along with the corresponding measurement unit.

In some embodiments, the template unit is an encrypted template unit. Processing logic can decrypt the encrypted template unit using a corresponding key. The sub-result is determined based on a comparison of the measurement unit and the decrypted template unit.

At block 215, processing logic determines whether the measurement unit corresponds to a template unit of multiple template units. In some embodiments, the template unit represents a portion of a biometric template that represents a characteristic of the user that distinguishes the user from other users. If processing logic determines that the measurement does correspond to the template unit, processing logic proceeds to block 220. If processing logic determines that the measurement does not correspond to the template unit, processing logic proceeds to block 230.

At block 220, processing logic determines a sub-result of multiple sub-results. In some embodiments, the sub-result is based on a comparison between the measurement unit and the template unit. The sub-result indicates a similarity between the measurement unit and the template unit. In some embodiments, operation of block 220 can be performed responsive to determining that the measurement unit corresponds to the template unit.

In some embodiments, to determine the sub-result based on the comparison of the measurement unit to the template unit, processing logic determines a distance between the measurement unit and the template unit. The sub-result includes an indication of the determined distance.

In some embodiments, the measurement unit includes a first vector coordinate of a first vector in Euclidian space and the template unit includes a second vector coordinate of a second vector in the Euclidian space. The determined distance is a distance between the first vector coordinate and the second vector coordinate in the Euclidian space.

In some embodiments, the biometric measurement has been transformed using a machine learning model into the first vector that includes first vector coordinates in the Euclidian space. The biometric template has been transformed using the machine learning model into the second vector that includes second vector coordinates.

At block 225, processing logic sends the sub-result to a second node of the multiple nodes. The authentication of the user is based at least in part on the sub-result.

At block 230, processing logic sends the measurement to another node of the multiple nodes responsive to determining that the measurement unit does not correspond to the template unit.

Figure 3A:
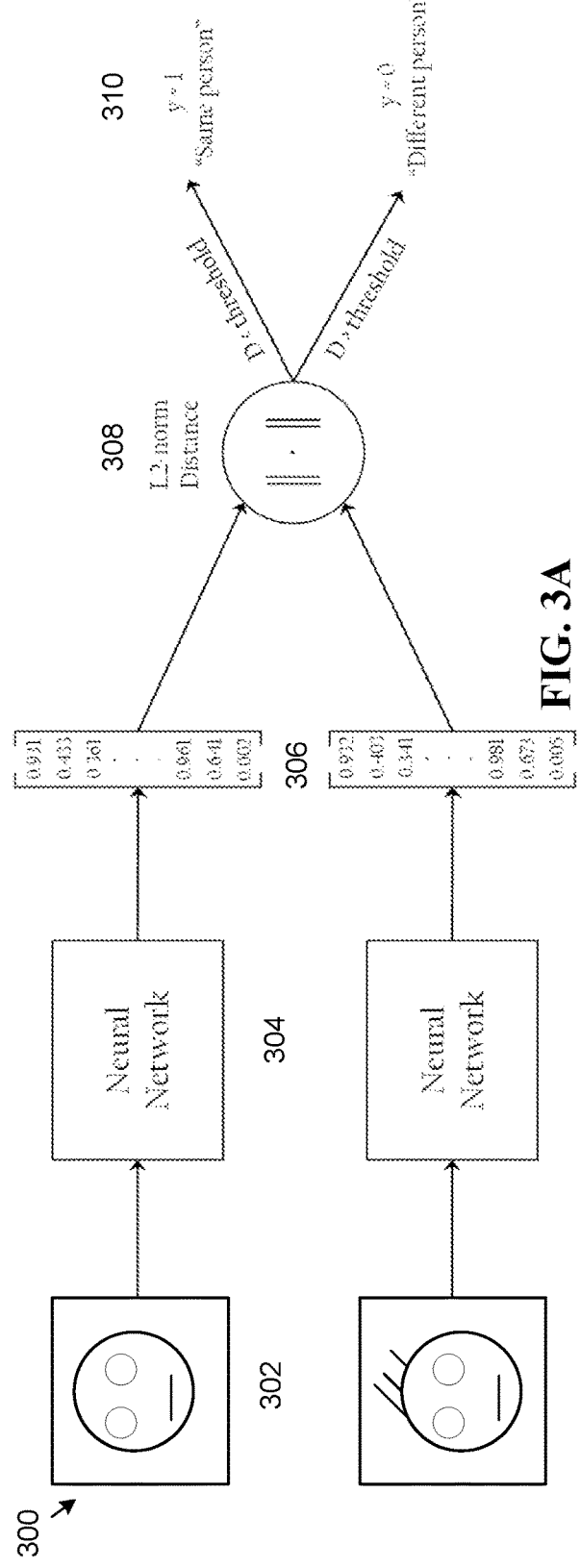
FIG. 3A illustrates on operation for determining a similarity between data sets, in accordance with embodiments of the disclosure.

FIG. 3A illustrates on operation for determining a similarity between datasets, in accordance with embodiments of the disclosure. Operation 300 can be applied to aspects of the disclosure. At stage 302, a biometric measurement is obtained. The top picture can represent a biometric measurement. The bottom picture can represent a biometric sample used to create a biometric template. The biometric measurement and the biometric sample can be used as input to stage 304.

At stage 304, the biometric measurements are used as input to respective machine learning models. The machine learning model can translate the input from one domain (e.g., images) to another domain (e.g., vectors).

At stage, 306 the output of the machine learning model at the top is a set of vector coordinates of a measurement vector in Euclidian space that represent the biometric measurement. Each of the vector coordinates of the measurement vector can represent a measurement unit. The output of the machine learning model at the bottom is also a set of vector coordinates of a template vector in the same Euclidian space. Each of the vector coordinates of the template vector can represent a template unit.

At stage 308, the distance between the two vectors is determined. In some examples, the L-2 norm distance can be used and is further described with respect to FIG. 4. The commutative property of determining the distance between vectors in Euclidian space can be used when calculating the distance between the measurement vector and the template vector. By using the commutative property, calculating distance between different vectors can be split into smaller operations, the output of which is later combined to determine the distance between the two vectors. For example, the distance (e.g., sub-results) between two coordinates of different vectors can be determined at a first node, and the distance between a different two coordinates can be determines at a second node. The two determined distances can later be aggregated to determine the distance of the two vectors.

At stage 310, the distance between the two vectors is compared to a threshold. If the distance is less than the threshold, the biometric measurement is similar enough to the biometric template to determine that the biometric measurement is from the same person as the biometric template. If the distance is greater than the threshold, the biometric measurement is not similar enough to the biometric template to determine that the biometric measurement is from the same person as the biometric template. In can be noted that in embodiments, the biometric template and the biometric measurement are not identical.

Figure 3B:
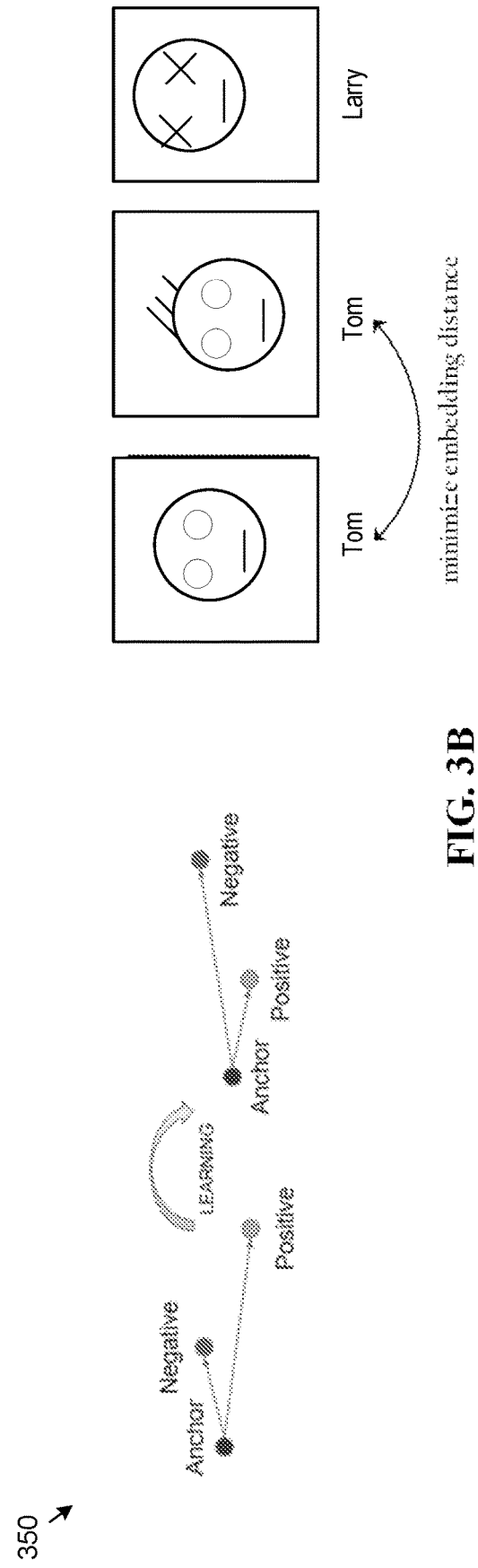
FIG. 3B illustrates a mapping of input biometric data to a Euclidian space, in accordance with embodiments of the disclosure.

FIG. 3B illustrates a mapping of input biometric data to a Euclidian space, in accordance with embodiments of the disclosure. A network, such as network 100 can translate input biometric data (e.g., biometric measurements or biometric templates), such as input face images, into an Euclidean space where similar biometric data (e.g., similar faces) lie closer to one another (in concepts of L2-norm) than other biometric data that is dissimilar (dissimilar faces lie further away). In some embodiments, during a machine learning model training process (e.g., to generate a biometric template), the platform may utilized the triplet loss, running over triplets of biometric data (e.g., images)—two of which are of the same person while the third is of a different person.

The L2 norm may be described by the following equations. Giving two input N- and dimensional vectors, $X_1$ and $X_2$, the $L_2$-norm between them is defined as:

$$D \equiv \|X_1 - X_2\| = \sqrt{\sum_{i=1}^{N} (x_{1,i} - x_{2,i})^2}$$

where $x_{j,i}$ is the $i^{th}$ coordinate of the $j^{th}$ vector, i.e. $X_j = (x_{j,1}, x_{j,2}, L, x_{j,N})$.

The sub-$L_2$-norm distance of order k at index m is defined as:

$$D_m^{[k]} \equiv \sqrt{\sum_{i=m}^{m+k-1} (x_{1,i} - x_{2,i})^2}$$

Since calculating the squared $L_2$-norm is a linear operation, the squared $L_2$-distance between the two vectors is a sum of the sub-distances, constraint to the fact the orders of all sub distances sum up to N.

When k is taken equal to all sub-distances (it's a full divider of N), then the formula can be written:

$$D^2 = \sum_{i=1}^{N/k} (D_{(i-1)k+1}^{[k]})^2$$

The above is a private case and k can change from sub-distance to another. For example: N=10, k=5:

$$D^2 = \sum_{i=1}^{2} (D_{(i-1)5+1}^{[5]})^2 =$$

$$(D_1^{[5]})^2 + (D_6^{[5]})^2 = \sum_{i=1}^{5} (x_{1,i} - x_{2,i})^2 + \sum_{i=6}^{10} (x_{1,i} - x_{2,i})^2 = \sum_{i=1}^{10} (x_{1,i} - x_{2,i})^2$$

In the above example, two vectors of dimension 10 are split into two sub-vectors each (length 5). As mentioned, since calculating the (squared) norm is a linear operation, the squared L2-norm can be calculated in any order since it holds the commutative property.

Figure 4:
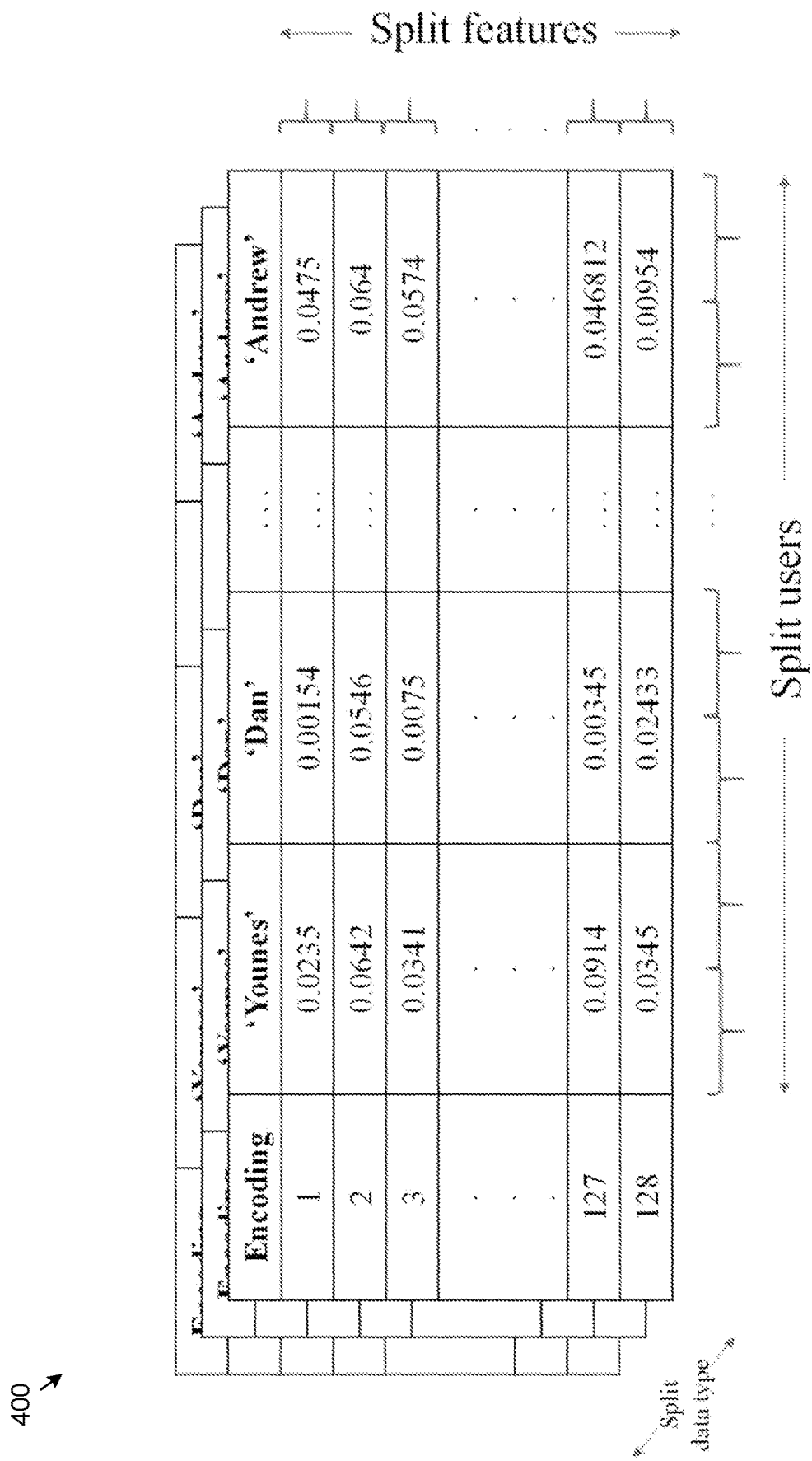
FIG. 4 is a diagram depicting the measurement units or template units of biometric data, in accordance with embodiments of the disclosure.

FIG. 4 is a diagram depicting the measurement units or template units of biometric data, in accordance with embodiments of the disclosure. The commutative property as described above with respect to FIG. 3A-3B holds also to the squared distance between two vectors in the multi-dimensional vector space created by the machine learning model. Given the aforementioned property, the network 100 can take given biometric data and translate it into multiple units, such as measurement units of a biometric measurement or template units of biometric template. The units can be distributed to various nodes, where each can store partial information (e.g., a measurement unit or template unit), and where each can compute partial information (e.g., sub-results).

As illustrated in diagram 400, the biometric data (e.g., biometric measurement or biometric template) is transformed into multiple vector coordinates. For example, the biometric data of "Younes," "Dan," and "Andrew" has each been transformed into 128 vector coordinates. In some embodiments, each of the transformations has the same number of vector coordinates. Each of the vector coordinates is associated with an identifier, as illustrated by the "encoding" column. In some embodiments, an identifier of a vector coordinate can correspond to a relative order of vector coordinates of a vector. For example, the first vector coordinate (e.g., encoding 1) can be the vector coordinate closest to the origin. The second vector coordinate (e.g., encoding 2) can be the vector coordinate second closest to the origin, and so forth.

In some embodiments, when a user requests a service, such as authentication, a user device sends to nodes of the network 100 the user's embedding (e.g., the conversion of the biometric measurement into one or more coordinate points in high-dimensional space). Each different node (e.g., comparison nodes 108) will compute its own sub-result, such as a sub-L2-norm. The sub-results of the computation may be returned to one or more arbiter nodes that sum the sub-L2-norms to yield a final decision. An embedding may refer to feature learning techniques where features of data (e.g., biometric measurement) are mapped or translated to vectors of real numbers in a high-dimensional space. In some embodiments, one or more of a measurement units of a biometric measurement of a biometric measurement or template units of a biometric template can be an embedding.

Figure 5:
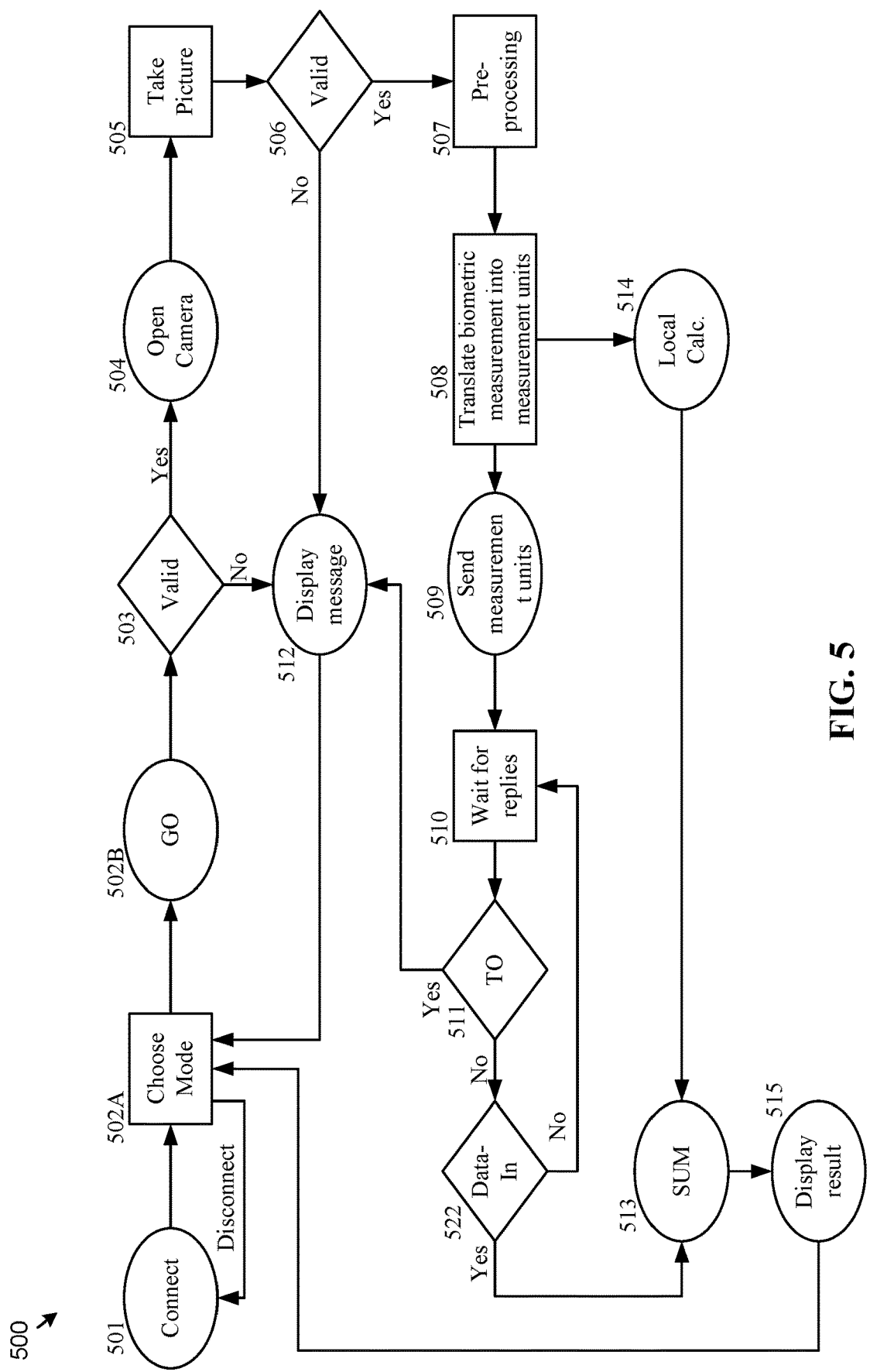
FIG. 5 is a flow diagram of a method of performing an authentication or identification operation using nodes of a network, in accordance with embodiments of the disclosure.

FIG. 5 is a flow diagram of a method of performing an authentication or identification process using nodes of a network, in accordance with embodiments of the disclosure.

At operation 501, processing logic executing method 500 (e.g., executing at a node, such node 102), connects to a network as illustrated by network 100. In the current example, node 102 represents a user device.

At operation 502A, the user may choose a mode of the operation such as (a) Authentication, (b) Identification, or (c) Enrollment. If at this stage the node raises an error, or the user wishes to close it, then the node will be disconnected from the network (w/o notifying other nodes). Enrollment can refer to the creation of a biometric template using one or biometric samples of the user.

At operation 502B, the user may select a mode of operation. For example, the user may select a 'GO' user interface element to start the respective process.

At operation 503, a validity check may be performed by the user device. The validity check may check that the user has entered all the necessary data to perform the selected mode. For example, the method may check to see if the user has supplied a user name for enrollment.

At operation 512, if the validity check is negative, a message may be displayed at the user device, and the operation returns to operation 502A. For example, if an error arises during the validity check, an error message indicative of the error is displayed at the user device and the process returns to operation 502A.

If the validity check is positive, the method proceeds to operation 504. At operation 504, the user device prepares to capture one or more biometric measurements of the user. It can be noted that a number of different modalities may be used to capture a biometric measurement. For purposes of illustration, rather than limitation, the modality described here is an optical camera. For example, at operation 504 the camera functionality of the user device may be invoked. It can be further noted that corresponding operations such as operations 505, 506, and 507 may be adjusted for different modalities or different biometric measurements.

At operation 505, a picture of the user is taken by the camera. The picture may be of the user's face, for example.

At operation 506, the method performs a validity check on the biometric measurement. For example, the validity check on a picture of the user's face may include one or more of verifying that the face size is within a pre-defined range, verifying the face luminance is within a pre-defined range, or checking that the image taken contains one face (e.g., no more and no less than one face).

If at operation 506 the validity check is negative, the method may return to operation 512 and display a message indicating an error with the validity check on the biometric measurement. In one embodiment, if at operation 506 the validity check is negative, the method may return to operation 505 to allow the user to take another biometric measurement.

If at operation 506 the validity check on the biometric measurement is positive, the method proceeds to operation 507. At operation 507, the user device performs one or more pre-processing operations on the biometric measurement. For example, the preprocessing operations for the photo may include one or more of face cropping (e.g., using face detection neural network), face alignment (e.g., using warping transformation, calculated from facial landmarks), face resizing and blob preparation, or face luminance correction (e.g., where all faces are calibrated to a pre-defined luminance value).

At operation 508, the neural network is called. For example, the machine learning model, such as a neural network, can receive the biometric measurement and produce measurement units that represent the biometric measurement. For instance, the machine learning model can translate the biometric measurement into a set of vector coordinates of a vector that represents the biometric measurement. The machine learning model can be executed by one or more nodes of the network 100.

At operation 509, the measurement units from operation 508 are sent to nodes of the network 100, as depicted in more detail in FIG. 1.

In an embodiment, if a local node (e.g., the node 103) contains a template unit then the local node may participate in the identification or authentication process (as illustrated in operation 514). It can also be noted that in an embodiment, the method 500 can proceed to operation 512 from operation 514.

At operation 510, the node, such as an arbiter node, waits to receive enough answers (e.g., sub-result groupings) from the network 100 in order to make a decision on the requested process (e.g., identification, authentication, etc.).

At operation 511, if a certain amount of time has been reached without receiving enough answers from the network 100 to make a decision on the requested process, the process times out.

If a time out is reached at operation 511, the method proceeds to operation 512 and displays a message indicating that the requested process has timed out.

At operation 522, a decision is made as to whether enough answers have been received from the network 100 in order to make a decision on the requested process. If the decision is that not enough answers have been received (e.g., less than a threshold amount), the method returns to operation 510. If the decision is that enough answer have been received (e.g., greater than a threshold amount), the method proceeds to operation 513.

At operation 513, the answers (e.g., squared sub-L2-norm distances) can be summed. Operation 513 may be performed by the user device or other node(s) in the network (e.g., arbiter). The final result of the summation can be checked against a threshold to determine a negative or positive identification or authentication.

At operation 515 the final result can be provided to the user device for display.

Figure 6:
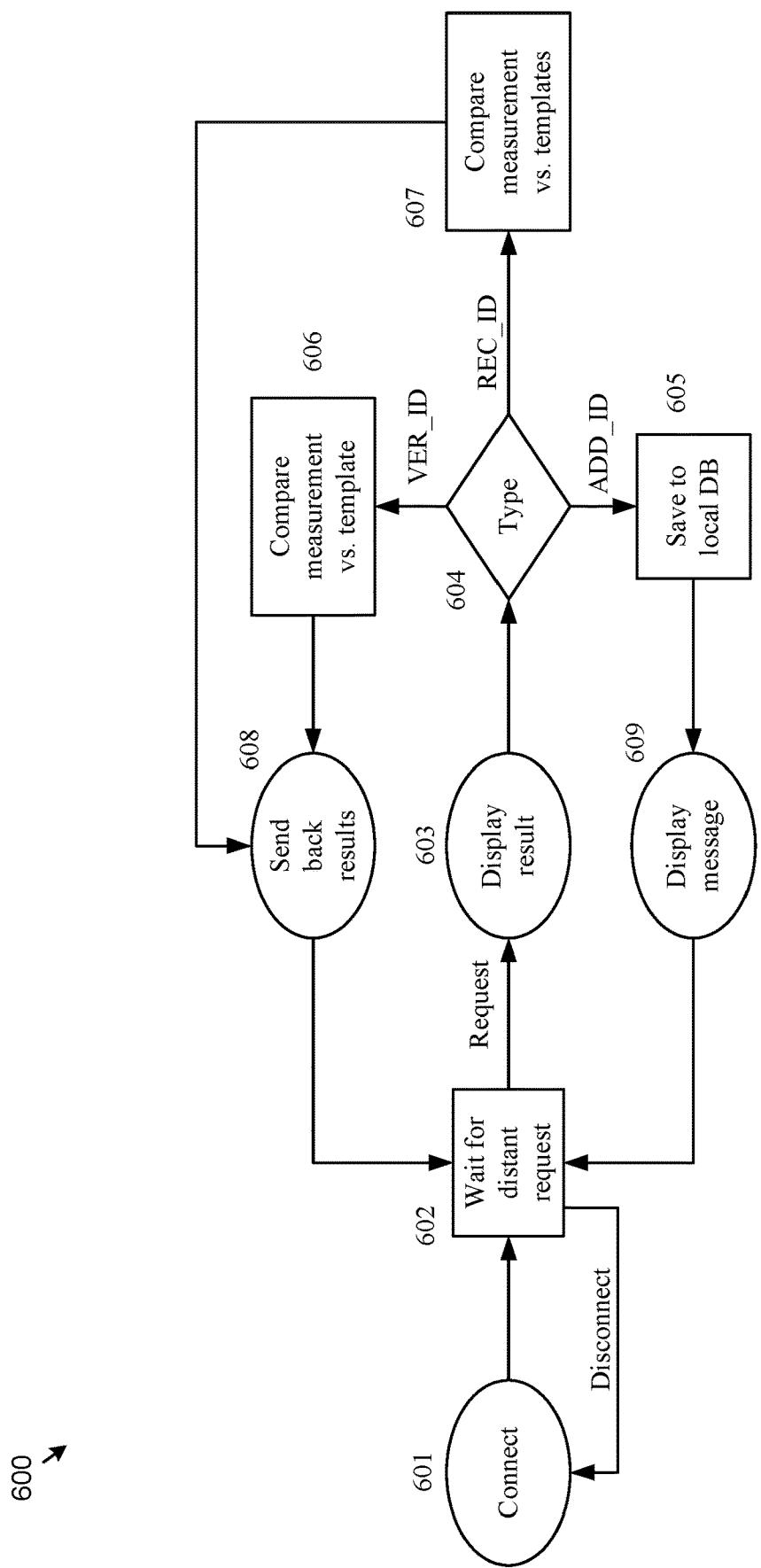
FIG. 6 is a flow diagram illustrating operations of a node participating in an authentication or identification operation in a network, in accordance with embodiments of the disclosure.

FIG. 6 is a flow diagram illustrating operations of a node participating in an authentication or identification operation in a network, in accordance with embodiments of the disclosure. At operation 601, a node connects to the network 100. For example, the node connects to a network having access to other nodes in a peer-to-peer (p2p) network.

At operation 602, the node waits for a request (e.g., authentication or identification request) from a distant node in the network. If at this stage the node raises an error, or the user wishes to close the node, then the node will be disconnected from the network (e.g., w/o notifying other nodes).

At some point, a request arrives and the method proceeds to operation 603. At operation, 603, a message indicative of the type of request may be provided to the node.

At operation 604, the node checks message for the type of request. For example, the message type can be: (a) ADD_ID (Enrollment) (b) VER_ID (Authentication) or (c) REC_ID (Identification).

If at operation 604, the node determines that the message type is 'ADD_ID' (Enrollment), the method proceeds to operation 605.

At operation 605, the node saves the piece of data (e.g., a template unit). For example, the node may store the piece of data locally or send the piece of data to the local database (DB) associated with the node.

At operation 609, the node may display a message indicating that the piece of data has been stored.

If at operation 604, the node determines that the message type is 'VER_ID' (Authentication), the method proceeds to operation 606.

At operation 606, the node compares the measurement unit received to the template unit to determine a similarity between the two. (e.g., sub-L2 norm).

At operation 608, the node sends back the results to a user device or other node (e.g., calculation node or arbiter node) before returning to operation 602.

If at operation 604, the node determines that the message type is 'REC_ID' (Identification), the method proceeds to operation 607.

At operation 607, the node compares the measurement unit received to all local template units. The results of the comparisons (e.g., distances) can be sent back to the user device or other nodes of the network at operation 608.

Figure 7:
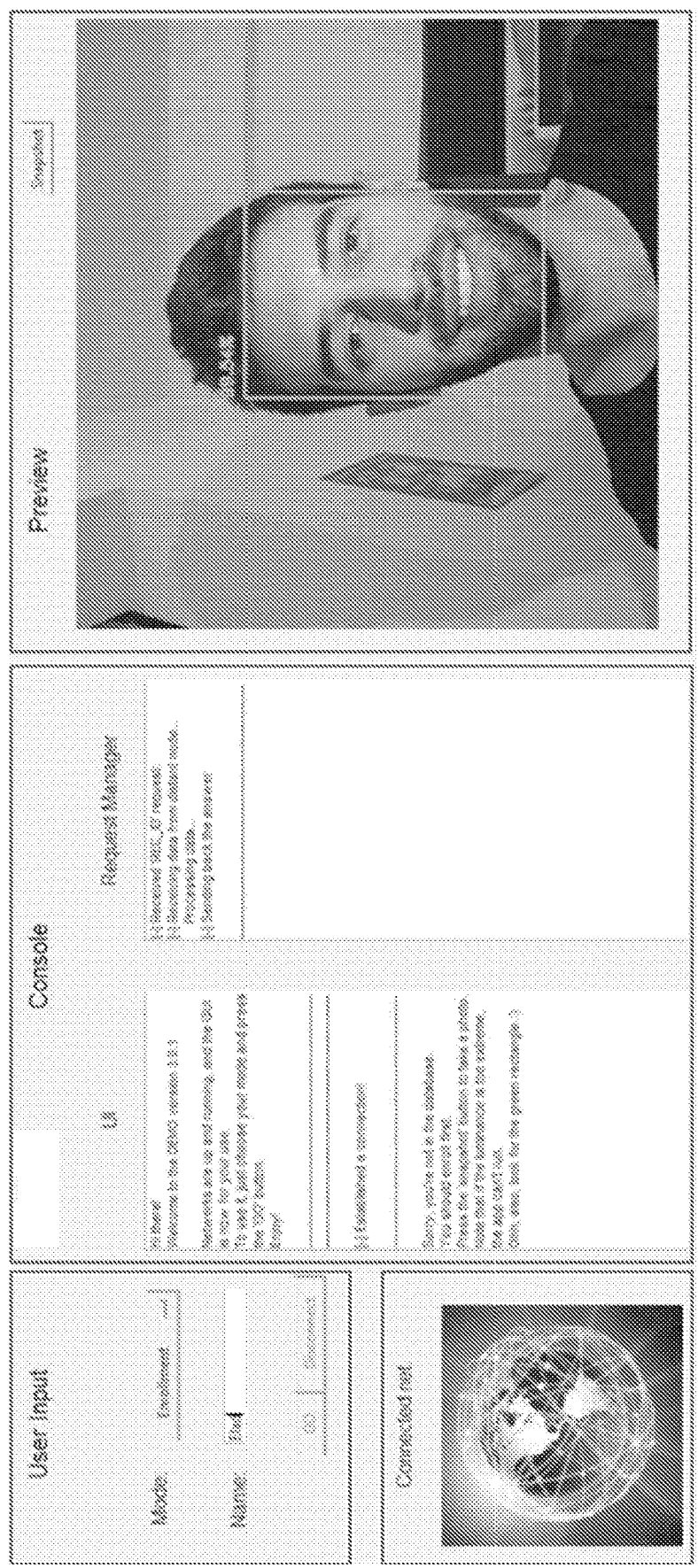
FIG. 7 is a graphical user interface (GUI) displayed at a node, in accordance with embodiments of the disclosure.

FIG. 7 is a graphical user interface (GUI) displayed at a node, in accordance with embodiments of the disclosure. The GUI is provided for purposes of illustration rather than limitation. It can be noted that in some embodiments the same, different, fewer, or additional elements may be included in the GUI and be located in the same or different positions.

In an embodiment, the GUI includes one or more of a user input area, a console area, a preview area, and a connectivity area.

The user input area includes a mode scrollbar that allows the user to choose the mode of operation (e.g., Authentication, Identification, Enrollment, etc.). The user input area includes a name entry element where a user can insert their name. The user input area includes a user interface input element (e.g., GO button) that is used to run the application, no matter the mode chosen. The user input area includes a user interface input element (e.g., Connect/Disconnect button) that is used to connect or disconnect the local node from the network.

The console area of the GUI displays to the user the different application messages. The messages can include information regarding both the interaction of the user with the application at the local node and requests coming in from distant nodes. The console area can include a user interface (UI) element that describes functions and operations of the local node to the user. The console area can include a request manager element that displays any requests by distant nodes received at the local node. For example, the request manager element may display the requests of the different request types that correspond to the different operation modes: VER_ID, REC_ID and ADD_ID (for Authentication, Identification and Enrollment, respectively).

The preview area of the GUI displays, in real-time, the biometric measurement, such as an image of the user's face. The application runs a face detection algorithm in real-time and displays a bounding-box over the face.

The connectivity area of the GUI indicates the nodes of the network that are still connected (can be fully connected or partially connected) to the network.

Figure 8:
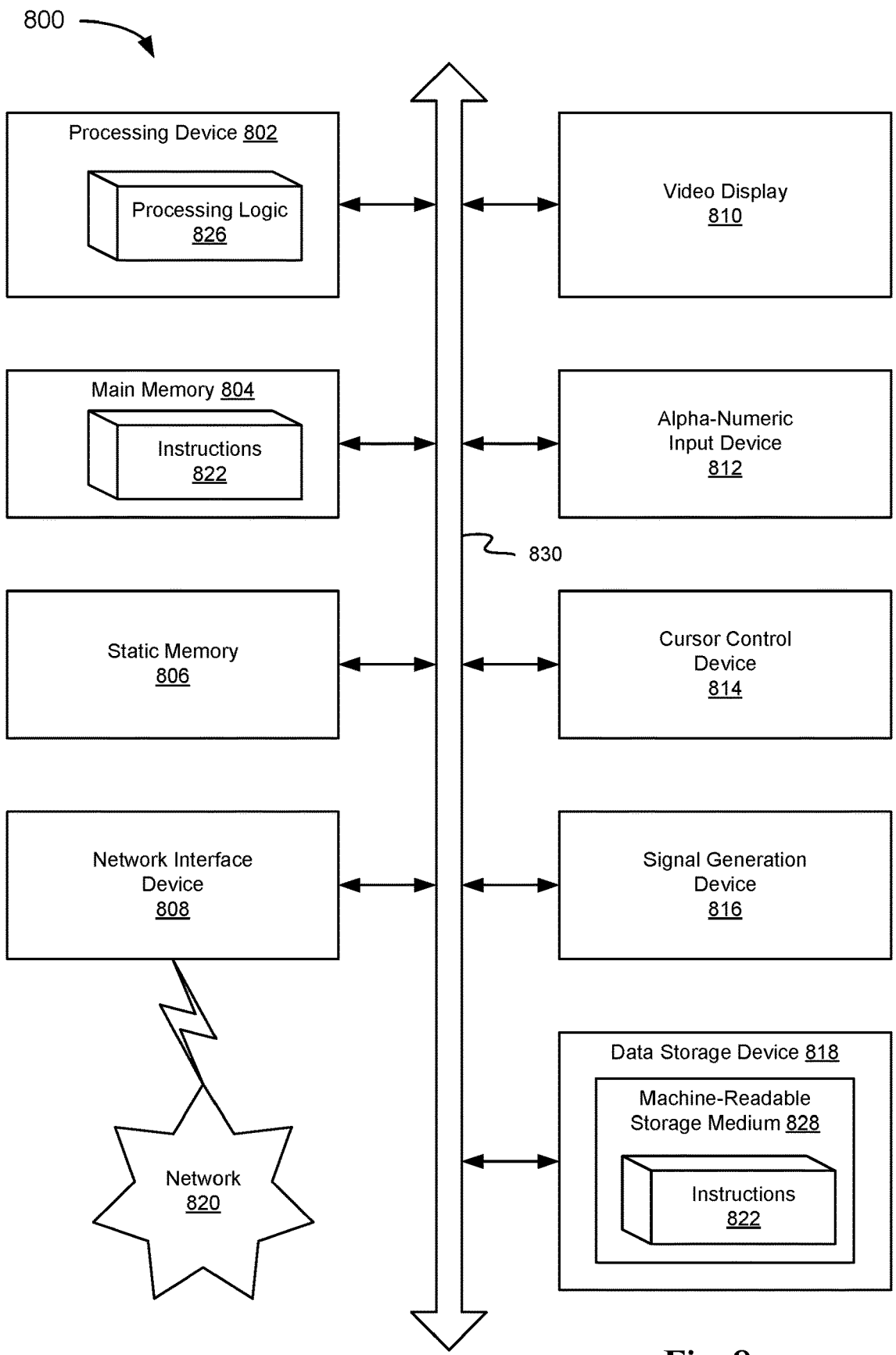
FIG. 8 illustrates a diagrammatic representation of a machine in the exemplary form of a computer system, in accordance with embodiments of the disclosure.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as a node of network 100 running biometric module 130.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein. In some embodiments, processing logic 826 can execute biometric module 130, as described herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808. In some embodiments, instructions 822 can include instructions to execute biometric module 130, as described herein.

The machine-readable storage medium 828 may also be used to store instructions of column lineage and metadata propagation, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "launching," "instantiating," "executing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Furthermore, the terms "first," "second," "third," "fourth," etc. as used herein are meant as labels to distinguish among different elements and may not necessarily have an ordinal meaning according to their numerical designation.

We claim:

1. A system for authentication of a user comprising:
   a decentralized network of electronic devices comprising
      a first subset of a plurality of nodes, wherein each of the first subset of nodes is configured to:
      receive a measurement unit of a plurality of measurement units in response to a request to authenticate the user, wherein each of the plurality of measurement units received represents a less-than-complete portion of a complete biometric measurement provided by the user in conjunction with the request to authenticate the user;
      determine a sub-result of a plurality of sub-results based on a comparison between the measurement unit and a template unit of a plurality of template units, wherein each of the plurality of template units corresponds to a respective less-than-complete portion of a complete biometric template previously provided by the user, wherein the complete biometric template previously provided by the user represents a characteristic of the user that distinguishes the user from other users, and wherein the sub-result indicates a level of similarity between the measurement unit and the template unit; and
      send the sub-result to a node of a second subset of the plurality of nodes, wherein authentication of the user is based at least in part on the sub-result.

2. The system of claim 1, wherein each of the first subset of nodes is further configured to:
   determine whether the measurement unit corresponds to the template unit based on a comparison between an identifier of the measurement unit and an identifier of the template unit, wherein the determination of the sub-result is responsive to determining that the measurement unit corresponds to the template unit.

3. The system of claim 1, wherein to determine the sub-result based on the comparison between the measurement unit and the template unit, each of the first subset of nodes is configured to: determine a distance between the measurement unit and the template unit, wherein the sub-result comprises an indication of the determined distance.

4. The system of claim 3,
   wherein the measurement unit comprises a first vector coordinate of a first vector in Euclidian space and the template unit comprises a second vector coordinate of a second vector in the Euclidian space, and
   wherein the determined distance is a distance between the first vector coordinate the second vector coordinate in the Euclidian space.

5. The system of claim 4,
   wherein the biometric measurement has been transformed using a machine learning model into the first vector comprising a first plurality of vector coordinates in the Euclidian space,
   wherein the biometric template has been transformed using the machine learning model into the second vector comprising a second plurality of vector coordinates.

6. The system of claim 1, further comprising the second subset of the plurality of nodes, wherein each of the second subset of nodes is configured to:
   aggregate one or more sub-results received from one or more nodes of the first subset of nodes into a sub-result grouping; and
   send the sub-result groupings to an arbiter node of the plurality of nodes, wherein the second subset of nodes each send a respective sub-result grouping of a plurality of sub-result groupings to the arbiter node.

7. The system of claim 6, further comprising the arbiter node, wherein the arbiter node is configured to:
   determine an authentication result based on the plurality of sub-result groupings, wherein the authentication result indicates whether the user is authenticated; and
   send the authentication result to a device associated with the request to authenticate the user.

8. The system of claim 1, wherein the authentication of the user is based on a zero-knowledge authentication technique where none of the plurality of nodes has a complete knowledge of the biometric template.

9. A system for authentication of a user comprising:
   a memory; and
   a processing device of a first node of a plurality of nodes, the processing device coupled to the memory, wherein the processing device is configured to:
      receive a measurement unit of a plurality of measurement units in response to a request to authenticate the user, wherein each of the plurality of measurement units received represents a less-than-complete portion of a complete biometric measurement provided by the user;
      determine whether the measurement unit corresponds to a template unit of a plurality of template units, wherein each of the plurality of template units represents a respective less-than-complete portion of a complete biometric template previously provided by the user, wherein the complete biometric template previously provided by the user represents a characteristic of the user that distinguishes the user from other users;
      responsive to determining that the measurement unit corresponds to the template unit, determine a sub-result of a plurality of sub-results based on a comparison between the measurement unit and the template unit, wherein the sub-result indicates a level of similarity between the measurement unit and the template unit; and
      send the sub-result to a second node of the plurality of nodes, wherein the authentication of the user is based at least in part on the sub-result.

10. The system of claim 9, wherein the processing device is further configured to:
    receive, from a third node of the plurality of nodes, the template unit of the plurality of template units.

11. The system of claim 10, wherein the template unit is an encrypted template unit, wherein the processing device is further configured to:
decrypt the encrypted template unit using a corresponding key, wherein the sub result is determined based on a comparison of the measurement unit and the decrypted template unit.

12. The system of claim 9, wherein the processing device is further configured to:
responsive to determining that the measurement unit does not correspond to the template unit, send the measurement unit to a fourth node of the plurality of nodes.

13. The system of claim 9,
wherein to determine the sub-result of the plurality of sub results based on the comparison of the measurement unit to the template unit, the processing device is further configured to determine a distance between the measurement unit and the template unit, and
wherein the sub-result comprises an indication of the determined distance.

14. The system of claim 13,
wherein the measurement unit comprises a first vector coordinate of a first vector in Euclidian space and the template unit comprises a second vector coordinate of a second vector in the Euclidian space, and
wherein the determined distance is a distance between the first vector coordinate and the second vector coordinate in the Euclidian space.

15. The system of claim 14,
wherein the biometric measurement has been transformed using a machine learning model into the first vector comprising a first plurality of vector coordinates in the Euclidian space,
wherein the biometric template has been transformed using the machine learning model into the second vector comprising a second plurality of vector coordinates.

16. The system of claim 9, wherein the first node is part of a decentralized network comprising the plurality of nodes, wherein the plurality of nodes are operated by different entities.

17. A method for authentication of a user comprising:
receiving, by a processing device, a measurement unit of a plurality of measurement units in response to a request to authenticate the user, wherein each of the plurality of measurement units received represents a less-than-complete portion of a complete biometric measurement provided by the user in conjunction with the request to authenticate the user;
determining whether the measurement unit corresponds to a template unit of a plurality of template units, wherein each of the plurality of template units represents a respective less-than-complete portion of a complete biometric template previously provided by the user, wherein the complete biometric template previously provided by the user represents a characteristic of the user that distinguishes the user from other users;
responsive to determining that the measurement unit corresponds to the template unit, determine a sub-result of a plurality of sub-results based on a comparison between the measurement unit and the template unit, wherein the sub-result indicates a level of similarity between the measurement unit and the template unit; and
sending the sub-result to a node of a plurality of nodes, wherein the authentication of the user is based at least in part on the sub-result.

18. The method of claim 17, further comprising:
receiving, from a third node of the plurality of nodes, the template unit of the plurality of template units.

19. The method of claim 17, wherein the template unit is an encrypted template unit, the method further comprising:
decrypting the encrypted template unit using a corresponding key, wherein the sub-result is determined based on a comparison of the measurement unit and the decrypted template unit.

20. The method of claim 17, further comprising:
responsive to determining that the measurement unit does not correspond to the template unit, sending the measurement unit to a fourth node of the plurality of nodes.

21. The method of claim 17,
wherein determining the sub-result of the plurality of sub-results is based on the comparison of the measurement unit to the template unit,
wherein the method further comprises determining a distance between the measurement unit and the template unit, and
wherein the sub-result comprises an indication of the determined distance.

22. The method of claim 21,
wherein the measurement unit comprises a first vector coordinate of a first vector in Euclidian space and the template unit comprises a second vector coordinate of a second vector in the Euclidian space, and
wherein the determined distance is a distance between the first vector coordinate and the second vector coordinate in the Euclidian space,
wherein the biometric measurement has been transformed using a machine learning model into the first vector comprising a first plurality of vector coordinates in the Euclidian space,
wherein the biometric template has been transformed using the machine learning model into the second vector comprising a second plurality of vector coordinates.

23. A non-transitory computer-readable medium comprising instructions that, responsive to execution by a processing device, cause the processing device to perform operations comprising:
receiving, by a processing device, a measurement unit of a plurality of measurement units in response to a request to authenticate a user, wherein each of the plurality of measurement units received represents less-than-complete portion of a complete biometric measurement provided by the user in conjunction with the request to authenticate the user;
determining whether the measurement unit corresponds to a template unit of a plurality of template units, wherein each of the plurality of template units represents a respective less-than-complete portion of a complete biometric template previously provided by the user, wherein the complete biometric template previously provided by the user represents a characteristic of the user that distinguishes the user from other users;
responsive to determining that the measurement unit corresponds to the template unit, determining a sub-result of a plurality of sub-results based on a comparison between the measurement unit and the template unit, wherein the sub-result indicates a level of similarity between the measurement unit and the template unit; and
sending the sub-result to a node of a plurality of nodes, wherein the authentication of the user is based at least in part on the sub-result.

24. The non-transitory computer-readable medium of claim 23, wherein the template unit is an encrypted template unit, the operations further comprising:
- decrypting the encrypted template unit using a corresponding key, wherein the sub-result is determined based on a comparison of the measurement unit and the decrypted template unit.

25. The non-transitory computer-readable medium of claim 23,
- wherein determining the sub-result of the plurality of sub-results is based on the comparison of the measurement unit to the template unit,
- the operations further comprising determining a distance between the measurement unit and the template unit,
- wherein the sub-result comprises an indication of the determined distance.

\* \* \* \* \*